United States Patent [19]

Uhlig

[11] 4,323,411

[45] Apr. 6, 1982

[54] METHOD FOR APPLYING PREFABRICATED PARTS TO BLOW MOLDED ARTICLES

[75] Inventor: Albert R. Uhlig, Toledo, Ohio

[73] Assignee: Owens-Illinois, Inc., Toledo, Ohio

[21] Appl. No.: 922,913

[22] Filed: Jul. 10, 1978

Related U.S. Application Data

[63] Continuation of Ser. No. 726,967, Sep. 27, 1976, abandoned.

[51] Int. Cl.³ .................. B32B 1/10; B29C 17/07; B29C 17/08; B29D 3/00
[52] U.S. Cl. .................. 156/245; 156/244.14; 264/509; 264/513; 264/515; 264/516; 264/526; 264/530; 264/536; 425/523; 425/525; 425/527; 425/530
[58] Field of Search .............. 264/89, 90, 92, 94, 264/96, 99, 154–156, 296, 512, 509, 515, 516, 513, 530, 536, 526; 425/296, 298, 302.1, 522, 523, 526, 527, 530, 525; 156/213, 224, 253, 245, 285, 244.14

[56] References Cited

U.S. PATENT DOCUMENTS

| | | | |
|---|---|---|---|
| 2,792,593 | 5/1957 | Hardgrove, Jr. | 425/384 |
| 3,072,969 | 1/1963 | DuBois | 264/94 |
| 3,337,911 | 8/1967 | Settembrini | 425/532 |
| 3,503,826 | 3/1970 | Nasica | 264/92 |
| 3,575,949 | 4/1971 | Humphrey | 264/94 |
| 3,767,747 | 10/1973 | Uhlig | 264/89 |
| 3,776,991 | 12/1973 | Marcus | 264/89 |
| 3,873,660 | 3/1975 | Reilly et al. | 264/89 |

FOREIGN PATENT DOCUMENTS 981640 1/1965 United Kingdom ............ 264/94

*Primary Examiner*—Jan H. Silbaugh
*Attorney, Agent, or Firm*—Charles S. Lynch; Myron E. Click; David H. Wilson

[57] ABSTRACT

A method for applying prefabricated parts for reinforcing, supporting, forming, reshaping or labeling to articles blow molded from a thermoplastic material. A hot parison is blown in a mold into a preform having a shape slightly smaller than the finished article. The preform is then removed from its mold and the prefabricated part is attached to the preform. The preform is then blow molded to impart the finished shape to the article and to embed the prefabricated part into the article.

2 Claims, 43 Drawing Figures

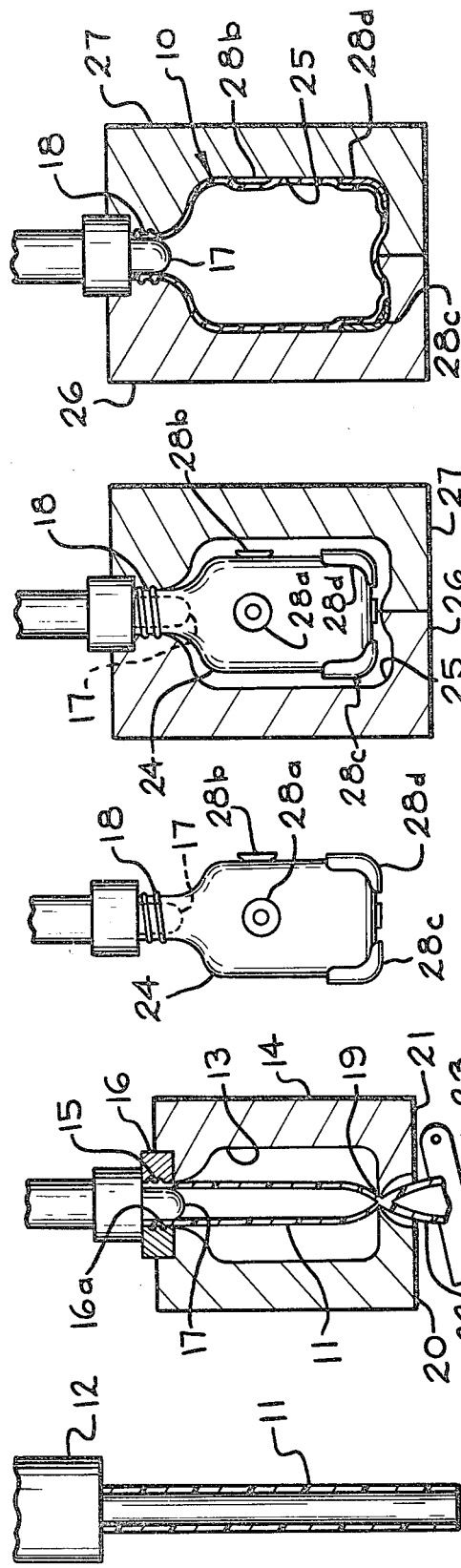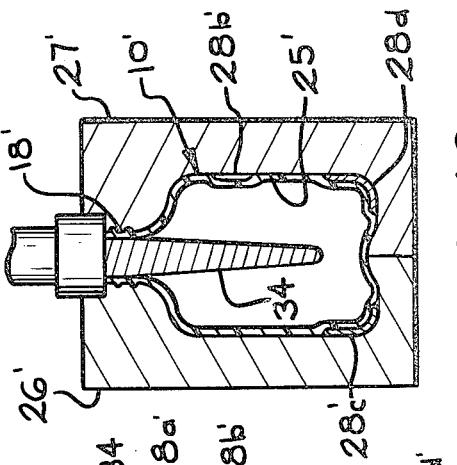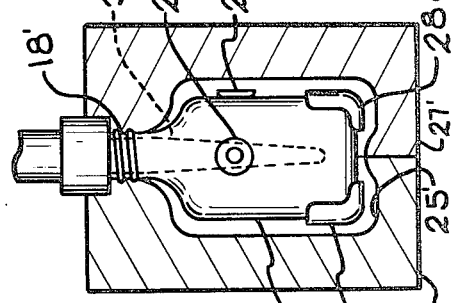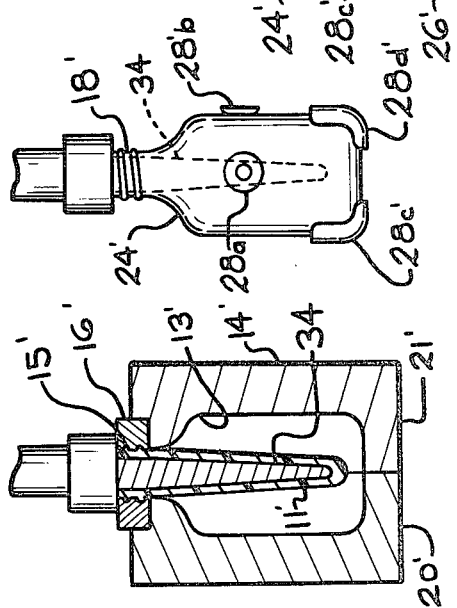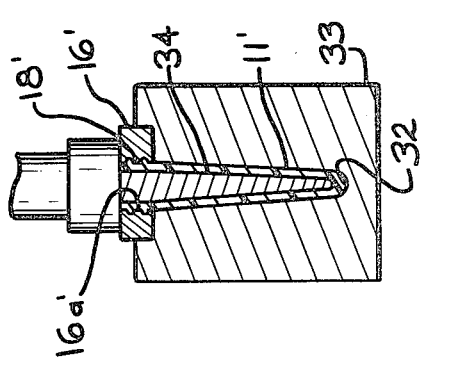

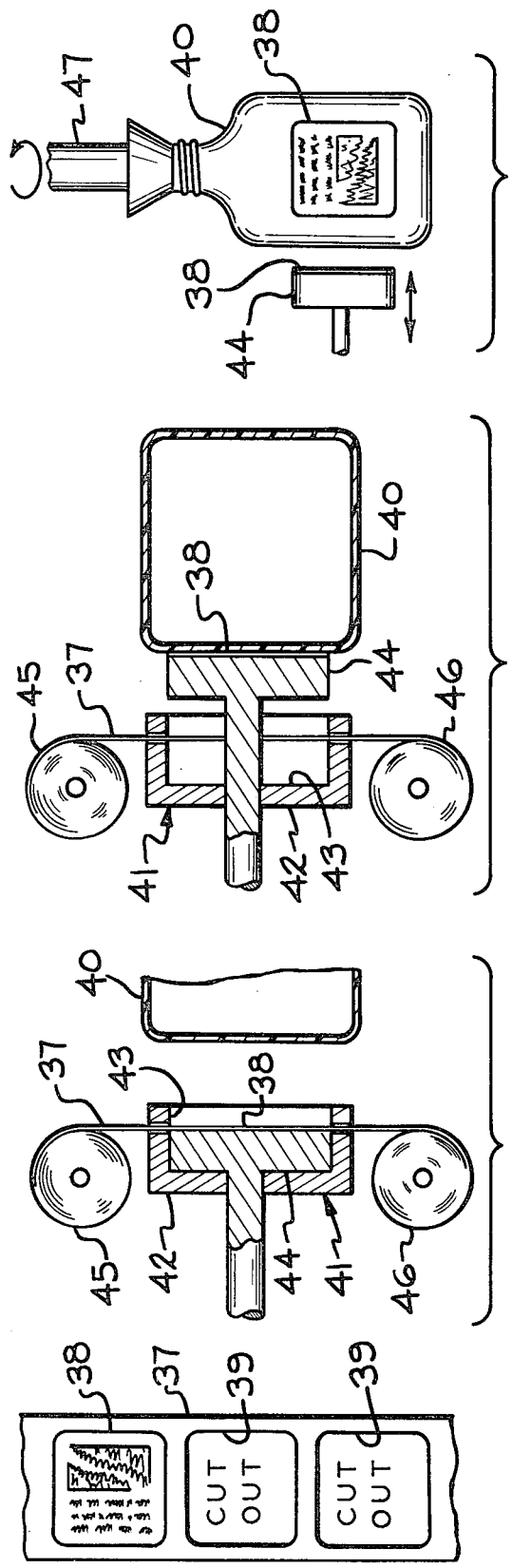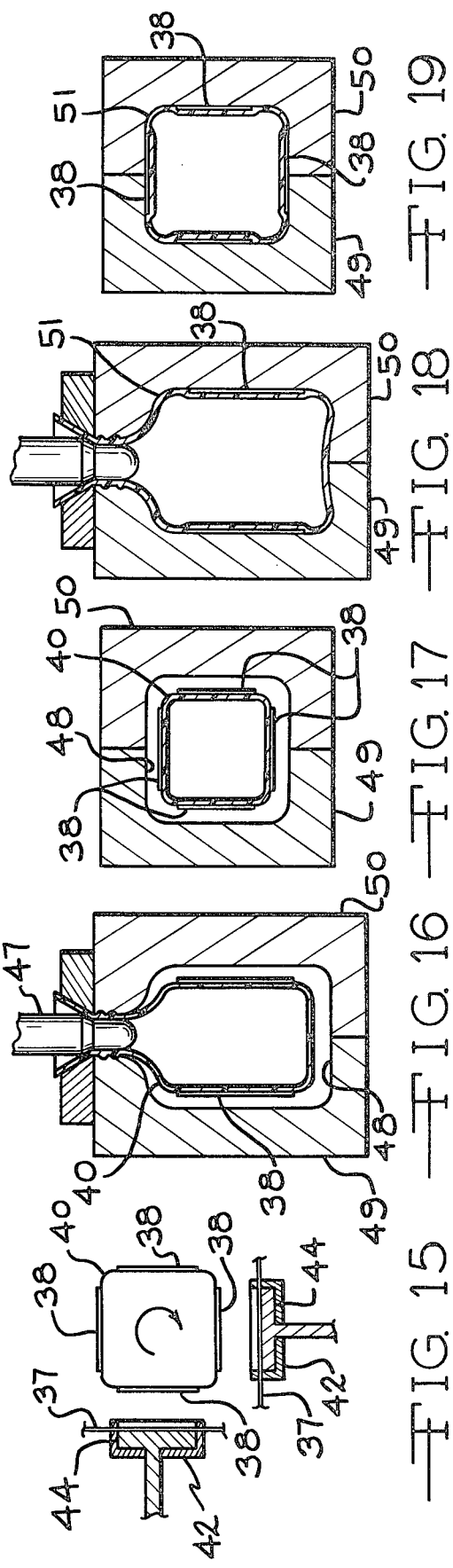

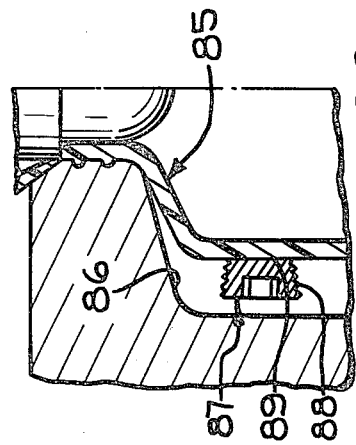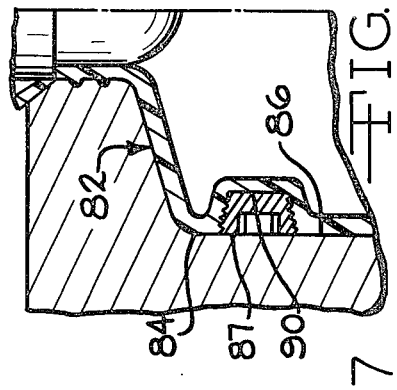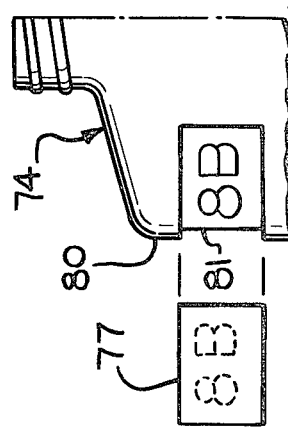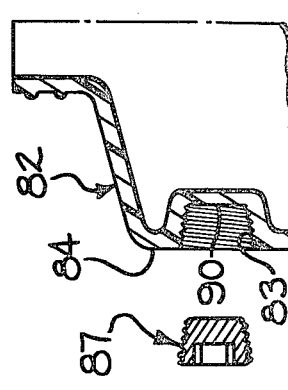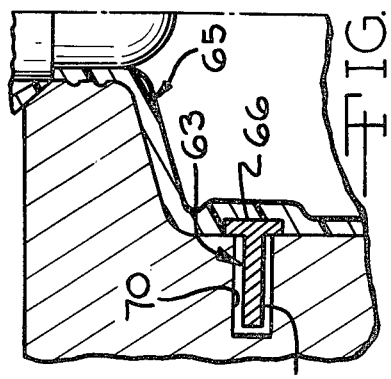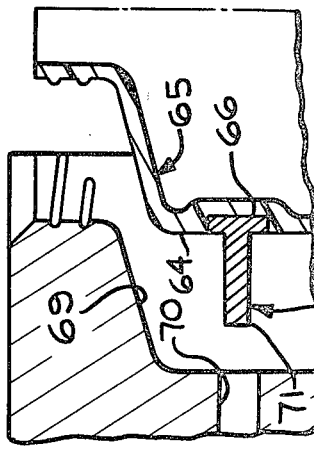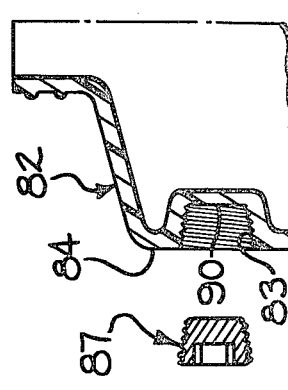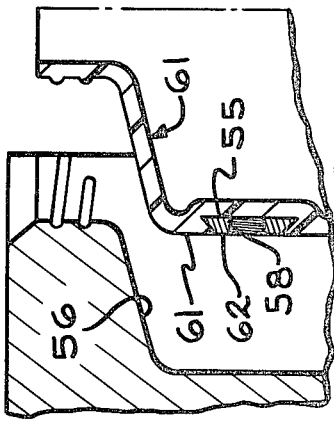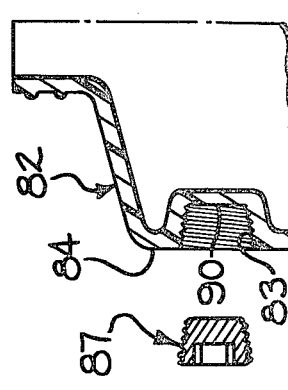

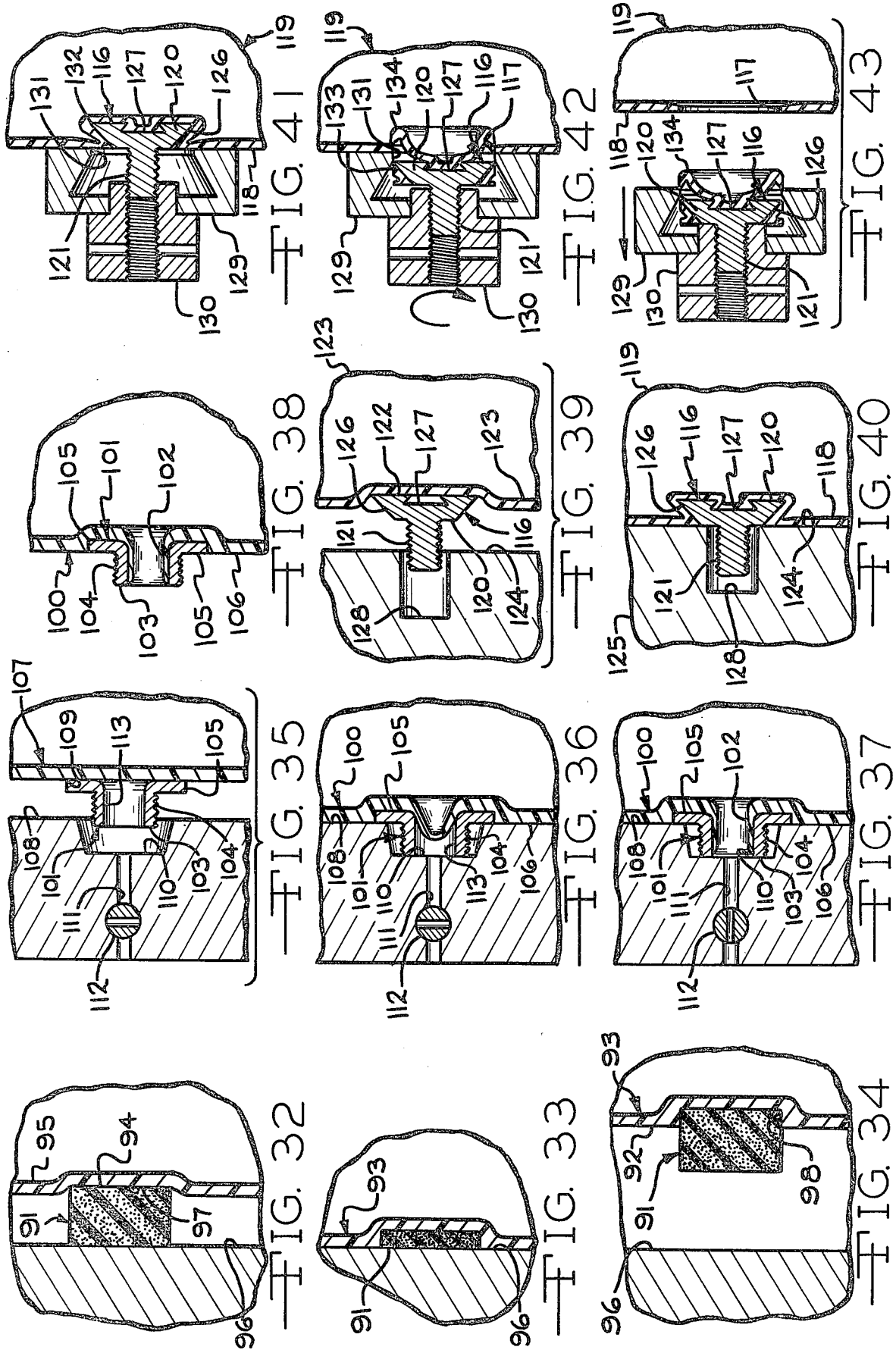

METHOD FOR APPLYING PREFABRICATED PARTS TO BLOW MOLDED ARTICLES

This is a continuation of application Ser. No. 726,967 filed Sept. 27, 1976, now abandoned.

BACKGROUND OF THE INVENTION

This invention relates to blow molded articles and more particularly to a method for applying prefabricated parts to articles blow molded from a thermoplastic material.

Considerable difficulty has been encountered in the past in applying labels to bottles and other containers blown from polyvinyl chloride (PVC), polyethylene and other thermoplastic materials. Early attempts generally consisted either of gluing a preprinted paper label to the finished bottle or directly printing the label on the bottle. However, problems occurred due to the complex curved surfaces of the blow bottle. Other attempts were made at printing directly on the interior surface of a mold in which the bottle was blown. During the blowing process, the printing is transferred to the bottle when the hot plastic is blown into contact with the mold surfaces.

In a modification of this system, the printing or bottle decoration is placed on a leaf or foil having a layer of either thermoplastic or gluable material. The leaf is then positioned within the mold cavity prior to blowing the bottle. When the bottle is blown, the thermoplastic bottle material is forced into contact with and adheres to the leaf to form a complete decorated bottle within the mold cavity. A system of this type is shown, for example, in U.S. Pat. No. 3,267,186 which issued Aug. 16, 1966. In the method disclosed in this patent, the label is cut from a strip of preprinted labels by means of a stamp and is held against the face of the stamp by vacuum passages within the stamp. The stamp and label are then inserted into a opening in the mold cavity to a position wherein the face of the stamp forms a surface portion of the mold cavity. When a bottle is then blown within the mold cavity, the preprinted label adheres to the bottle. Apparatus for manufacturing bottles in accordance with this method is quite expensive due to the high cost for the bottle blowing mold which must provide an opening for receiving the stamp and must be mounted to cooperate with the stamp for positioning the labels or leafs within the mold cavity. Furthermore, it is only practical to place a single label on a portion of the bottle with apparatus of this type while other prior art techniques such as labeling the bottle after blowing permits the placement of multiple labels on the bottle at different locations. Another disadvantage with prior art techniques of applying labels to bottles during the final blow molding is in obtaining a good bond between such labels and the bottle. When the label is first positioned within the mold prior to blowing the bottle, the cooler mold surfaces cool the label sufficiently to prevent a welding or fusion between the label and the thermoplastic bottle material when a parison is blown into contact with the mold surfaces and the label. As a consequence, the label may subsequently separate from the bottle.

SUMMARY OF THE INVENTION

According to the present invention, an improved method is provided for attaching labels and other prefabricated parts to bottles and similar containers blow molded from a thermoplastic material. The method is not limited to bottle labels, being suitable also for attaching prefabricated parts such as reinforcements, threaded inserts, protruding inlays, rubber pads, embossing dies and similar parts to blow molded articles. The method is particularly adaptable to bottles formed from thermoplastic synthetic resinous materials by the "blow and blow" process.

According to the method of the present invention, a parison is formed from hot thermoplastic material either by free extruding a tube or by injection molding. The parison is positioned within a blow mold cavity and blown into a preform having the general shape of, and dimensions slightly smaller than, the finished article. The preform is then transferred into a blow mold cavity for blowing into the shape of the finished article. During transfer and prior to insertion into the blow mold cavity, one or more prefabricated parts are attached to the preform. The parts may be attached either with an adhesive or by fusing the part to the preform. Fusion between the part and the preform may be enhanced either by reheating to a tacky state the surface area of the preform to which the part is to be attached or by heating a thermoplastic layer on the prefabricated part to a tacky state, or heating both, and then moving the part into contact with the preform. After the part or parts are attached to the preform, the preform is positioned within the blow mold cavity and blown into the finished shape of the article. When the preform is blown into contact with the walls of the mold cavity, the previously attached parts are embedded into the walls of the finished article and permanently held in place by a fusion or welding between the part and the bottle.

Where the prefabricated part is a printed label, the printing is preferably laminated between two layers of material similar to the material from which the bottle is manufactured. The labels may be printed on a continuous strip and fed through a transfer machine which includes a die or stamp for cutting the individual labels from the coil and transferring such labels to the preform. The preform may be rotated for applying labels to different sides, or the label applicator may be designed with multiple stamps for simultaneously applying labels at more than one location on the preform.

The method of the present invention is also suitable for attaching prefabricated parts other than labels to articles blow molded from thermoplastic materials. A part in the form of either an insert having a threaded opening or a protruding inlay having a head and a protruding part such as a threaded stud, may be attached to the preform during transfer from the preform mold to the final blow mold. In the case of a protruding inlay, the blow mold is adapted with a recess to receive the protruding part. In either case, the integrity of the walls in the finished bottle is not affected by the embedding of the prefabricated part in the bottle or other blow molded part. In still another embodiment, a metal lettering plate with raised letters or a decorating plate with an embossed or textured surface is attached to the preform during transfer to the final blow mold for embedding in the surface of the article. The plate is separated from the article to leave an embossed decoration or lettering in the article. In still another embodiment, the insert or prefabricated part is in the form of a plug with outside threads. The plug is of metal or other material which will not bond to the article during molding. After molding, the plug is removed from the article by unscrewing, leaving a tapped closed bottom hole in the side of the article. When a pipe or hose is to be attached to the finished article, the inlay or prefabricated part may be in the form of a tubular insert having a flanged end which is adhered to the preform during transfer into the final blow mold cavity. The projecting end of the insert is provided with external threads. After the bottle is blown and prior to removing the blowing pressure from the blow mold, an opening within the insert is vented to the atmosphere to rupture the wall of the blown article at a point aligned with the opening through the insert. In still another embodiment of the invention, an inlay similar to a flat head screw with a protruding threaded stem is attached to the preform and embedded within the article during blowing. After the container is removed from the final blow mold, a cutting device is attached to the threaded stem and the insert is pulled into the cutting device for shearing a hole into the wall of the blown article. The hole may have any desired configuration by providing such configuration to the portion of the insert embedded in the article. It should be noted that when the inlay is pulled from the container, the portion of the container wall adhered to the inlay will also be pulled from the container to leave a clean hole, eliminating the need for cleaning the interior of the container to remove the plastic from the hole area.

Accordingly, it is an object of the invention to provide an improved method for attaching prefabricated parts to containers blow molded from a thermoplastic material.

Another object of the invention is to provide an improved method for attaching labels to bottles formed from a thermoplastic material by the blow and blow process.

Other objects and advantages of the invention will become apparent from the following detailed description, with reference being made to the accompanying drawings.

BRIEF DESCRIPTION OF THE DRAWINGS

FIGS. 1-5 show the steps in a method for forming a bottle from a thermoplastic material by the blow and blow method with an extruded parison and incorporating the present invention for attaching prefabricated parts to the bottle;

FIGS. 6-10 show the steps in a method for forming a bottle by the blow and blow process from a thermoplastic material with an injection molded parison and incorporating the present invention for attaching prefabricated parts to the bottle;

FIG. 11 is a fragmentary plane view of an elongated strip from which preprinted labels are cut for attachment to bottles in accordance with one embodiment of the invention;

FIGS. 12 and 13 show the sequential steps for cutting and applying a preprinted label to a preform prior to transfer to a final blow mold cavity during the manufacture of a bottle in accordance with one embodiment of the invention;

FIGS. 14-19 show sequential steps for applying a plurality of labels to a preform prior to transfer to a blow mold cavity and then transferring and blowing the preform in the blow mold cavity during the formation of a bottle in accordance with the present invention;

FIGS. 20-22 show sequential steps for attaching a prefabricated part in the form of an insert with a threaded hole to a bottle blown in accordance with another embodiment of the present invention;

FIGS. 23-25 show the sequential steps for attaching and embedding a protruding inlay or prefabricated part to a bottle blown in accordance with still another embodiment of the invention;

FIGS. 26-28 show the sequential steps for embossing a decoration or lettering in a bottle blown in accordance with another embodiment of the present invention;

FIGS. 29-31 show the sequential steps for forming a blind threaded hole in a bottle blown in accordance with another embodiment of the present invention;

FIGS. 32-34 show the sequential steps for attaching a rubber pad to a bottle blown in accordance with another embodiment of the present invention;

FIGS. 35-38 show the sequential steps for attaching an externally threaded tubular insert with a central opening to a bottle formed in accordance with another embodiment of the invention and for forming a hole in the wall of the bottle aligned with an opening through the insert; and FIGS. 39-43 show a method for forming an opening in the wall of a bottle formed by the blow and blow method by attaching an insert to the wall of the preform prior to transferring to the final blow mold cavity, blowing the bottle and, subsequent to removing the bottle from the mold, withdrawing the insert from the wall of the bottle.

DESCRIPTION OF THE PREFERRED EMBODIMENTS

Turning now to the drawings and particularly to FIGS. 1-5, the sequential steps are illustrated for attaching prefabricated parts to a bottle 10 blow molded in accordance with one embodiment of the present invention. In the first step of forming the bottle 10, a tubular parison 11 is free extruded from an orifice or nozzle 12 in a conventional extruding machine. The parison 11 is extruded from a thermoplastic material, such as a polyvinyl chloride or a polyethylene. The parison 11 is extruded to a length longer than that necessary for blowing the bottle 10 to assure that sufficient material is present for blowing the bottle 10. From the nozzle 12, the parison 11 is transferred into a cavity 13 in a preform blow mold 14. The cavity 13 has the general shape of the exterior of the bottle 10, only it is slightly smaller than the exterior dimensions of the finished bottle 10. As shown in FIG. 2, an upper end 15 of the parison 11 fits within a shaped opening 16a in a die 16. A pin 17 in inserted concentrically within the die opening 16a for forming an externally threaded neck portion 18 of the finished bottle 10. The parison 11 depends from the die 16 through the center of the cavity 13 and is pinched at a lower point 19 between two mold halves 20 and 21 which form the blow mold 14. The excessive parison material forms a tail 22 which extends exterior to the cavity 13 and is removed from the mold 14 by pulling with a suitable tool 23 after the pinched area has set sufficiently to prevent the formation of a hole in the parison 11. Compressed gas is injected through the pin 17 to expand the parison 11 into contact with the walls of the mold cavity 13, thereby defining a preform 24. The die 16 and the mold halves 20 and 21 are separated from the preform 24 to permit transferring the preform 24 into a cavity 25 within a final blow mold defined by the two mold sections 26 and 27. Transfer may be accomplished either by moving the preform 24 from between the separated mold halves 20 and 21 to between the mold halves 26 and 27 or by moving the separated mold halves 20 and 21 away from the preform 24 and moving the mold halves 26 and 27 to a position surrounding the preform 24. During transfer, the preform 24 is supported by its neck 18 on the pin 17, as shown in FIG. 3. At this stage, one or more prefabricated parts are attached to the preform 24 for embedding at predetermined points in the walls of the blown bottle 10. The prefabricated part attached to the preform 24 may serve various purposes, such as labeling, decorating, reinforcing, supporting, forming or reshaping. Exemplary parts 28a–28d are shown attached to the preform 24 in FIG. 3. The parts 28a–28d may be attached to the preform 24 with a suitable adhesive or, preferably, are attached by a welding action between the parts 28a–28d and the exterior surfaces of the preform 24. The welding or fusion between the parts 28a–28d and the preform 24 may be achieved by various techniques. For example, the wall areas of the cavity 13 in the blow mold 14 which form the surface areas of the preform 24 to which the parts are attached may be selectively heated to maintain such surface areas in a soft or tacky state or such wall areas of the mold cavity 13 may be coated with a thermal paint to prevent cooling of the adjacent surface areas of the preform 24 when the preform 24 is blown into contact with the mold 14. Still another method for attaching the parts 28a–28d to the preform 24 involves forming at least the inner surface areas on the parts 28a–28d which contact the preform 24 from a thermoplastic material, and preferably the same material from which the preform 24 is formed. These inner surface areas on the parts 28a–28d are then preheated to a tacky state before moving such inner surface areas into contact with the preform 24. In still another method, both the parts 28a–28d and the surface areas of the preform 24 to which the parts 28 are adhered may be heated. In each of the cases, it is only necessary to move the parts 28a–28d into contact with the preform 24 to achieve sufficient bonding to hold the parts 28a–28d in place.

After one or more parts are attached to the preform 24, the preform 24 is transferred into the cavity 25 defined by the final blow mold sections 26 and 27, as shown in FIG. 4. The preform 24 is expanded into contact with the walls of the cavity 25, as shown in FIG. 5, by blowing through the pin 17 in the neck 18, thereby defining the final exterior shape of the bottle 10. The blown bottle 10 is left within the mold cavity 25 for sufficient time to cool the thermoplastic material to a non-plastic state. Then the mold halves 26 and 27 are separated to eject the bottle 10 from the cavity 25. It will be noted from FIG. 5 that the prefabricated parts 28a–28d are embedded within the walls of the bottle 10 and extend flush with the adjacent exterior surfaces of the bottle 10.

FIGS. 6–10 illustrate a slightly modified method for forming a bottle 10'. The components in FIGS. 6–10 which are similar to those in FIGS. 1–5 are labeled with the prime of the same reference number. As shown in FIG. 6, a parison 11' is injection molded within a cavity 32 defined between a mold 33 and a core 34. A die 16' extends around the upper part of the core 34 for molding an externally threaded bottle neck 18' at the upper end of the parison 11'. After molding, the parison 11' along with the core 34 and the die 16' are separated from the mold 33 and transferred into a cavity 13' defined by sections 20' and 21' of a blow mold 14', as shown in FIG. 7. The parison 11' is then blown into contact with the walls of the cavity 13' for defining a preform 24'. After blowing, the mold halves 20' and 21' are separated from the preform 24' and one or more prefabricated parts such as the parts 28a'–28d' are attached to the exterior surface areas of the preform 24', as shown in FIG. 8. The preform 24' and attached parts 28' are transferred into a cavity 25' defined by two blow mold sections 26' and 27', as shown in FIG. 9. After transferring to the mold cavity 25', the preform 24' is blown into contact with the walls of the mold cavity 25' to define the finished bottle 10', as shown in FIG. 10. After the thermoplastic material sets or hardens to a non-plastic state the mold sections 26' and 27' are separated for ejecting the bottle 10' from the mold cavity 25'. At this point, the prefabricated parts 28a'–28d' are embedded in the walls of the bottle 10' and extend flush with the exterior surfaces of the bottle 10'.

The methods illustrated in FIGS. 1–10 are particularly suitable for applying preprinted labels or decorations to bottles and other containers blown from thermoplastic materials. The labels are applied to the container during the transfer stage from the preform mold to the final blow mold. Preferably, the labels are in the form of a laminated foil consisting of printing sandwiched between two layers of the same thermoplastic material from which the container is formed. As shown in FIG. 11, the foil may be in the form of an elongated strip 37 having a number of preprinted labels 38 spaced along its length. The labels 38 are cut from the strip 37, leaving cutouts 39 in the strip 37. The labels 38 may be precut from the strip 37 for application to a preform 40 or, preferably, the labels 38 are cut from the strip 37 and applied to the preform 40 in a single step by a die assembly 41. The die assembly 41 includes an outer member 42 having an interior opening 43 defining the exterior shape of the labels 38. An applicator plunger 44 reciprocates from a retracted position within the outer member opening 43, as shown in FIG. 12, to an extended position adjacent the preform 40, as shown in FIG. 13. While the applicator plunger 44 is in the retracted position, the foil strip 37 is advanced from a supply roll 45 to take-up roll 46 until a label 38 is aligned with the opening 43. The applicator plunger 44 is advanced to cut the label 38 from the foil strip 37 and then to apply such cut label 38 to the preform 40. As the plunger 44 is advanced to apply the label 38 to the preform 40, hot gases may be directed towards the label 38 for heating it sufficiently to adhere to the preform 40. Or, the applicator plunger 44 may be heated to in turn heat the label during application to the preform 40. Where desired, one or more passages (not shown) may be provided within the plunger 44. By applying a vacuum to these passages, the cut label 38 is held firmly in place against the plunger 44 during its movement to a position with the label 38 contacting the preform 40. When the vacuum is released, the label 38 will in turn be released and the plunger 44 is retracted back into the opening 43 for cutting and applying the next label 38. Or, the plunger 44 may be stopped short of the preform 40 and compressed air is applied to the passages for blowing the label 38 into the contact with the preform 40.

As shown in FIG. 14, the plunger 44 may be used for applying a plurality of labels 38 to a single preform 40 merely by rotating the preform 40 on a pin or support member 47 each time a label 38 is applied to the preform 40 and the plunger 44 is reciprocated to its retract position. In the case of a square preform 40, the preform 40 may be rotated through four 90° increments for applying a label to each of four sides or through 180° increments for applying labels to two opposite sides. Or, a plurality of plungers 44 may be provided for simultaneously applying a plurality of labels to the preform 40, as shown in FIG. 15. In the embodiment shown in FIG. 15, two applicator plungers 44 are provided for applying labels simultaneously on two sides of the square preform 40. After the two labels are applied, the preform 40 is rotated 180° and labels are applied to the remaining two sides of the preform 40 to produce a square or rectangular bottle having a label on each of four sides.

After one or more labels 38 are applied to the preform 40, the preform 40 is transferred into a cavity 48 defined by two blow mold sections 49 and 50, are shown in cross section in FIGS. 16 and 17. After the preform 40 and attached labels 38 are inserted into the mold cavity 48, the preform 40 is expanded into contact with the walls of the mold cavity 48 to complete blowing of a bottle 51, as shown in cross section in FIGS. 18 and 19. Blowing is accomplished at relatively high pressure, for example, approximately 90 pounds per square inch. This pressure is sufficient to weld or fuse the labels 38 to the walls of the bottle 51. After the bottle 51 is blown, the mold sections 49 and 50 are opened to eject a complete labeled and/or decorated bottle. As a consequence, the prior art steps of decorating or printing on the bottle after the bottle is blown are eliminated. The printing operation is simplified over prior art techniques of printing on the bottle after molding since it is not necessary to print on the sides of a bottle which may be highly contoured and also may be relatively flexible, depending upon the thickness and the properties of the thermoplastic material from which the bottle was made.

The remaining drawings are directed to examples using the method of the present invention for attaching specific types of prefabricated parts to the wall of a container or other hollow article blow molded from thermoplastic material. FIG. 20 illustrates a fragment of a bottle preform 54 with an attached prefabricated part 55 inserted in a final blow mold cavity 56. The part 55 is in the form of a flat inlay and is attached to a flat side 57 of the preform 54. The inlay 55 is annular or ring shaped and has a threaded central opening 58. The inlay 55 also includes a tapered annular edge 59 which is embedded within the container wall 60 during blowing, as shown in FIG. 21. The tapered edge 59 provides a strong mechanical bond between the part 55 and the container wall 60. FIG. 22 shows the blown bottle 61 separated from the blow mold cavity 56. It will be noted that the part 55 is completely embedded within the container wall 61 and has a flat outer surface 62 which extends flush with the container wall 60. The threaded opening 58 through the part 55 provides a blind, threaded hole in the wall of the container 61 for attaching various parts to the container 61. The method illustrated in FIGS. 20-22 may be used for attaching other similar types of parts to the bottle 61, such as other types of fasteners, reinforcement rings or reinforcement corners.

FIGS. 23-25 show the method of the present invention employed for attaching a prefabricated part 63 to protrude from a wall 64 of a blow molded container 65. The part 63 may have any desired form, such as the form of a hook, a handle, a threaded stud, or similar protruding member. The part 63 is provided with a head or generally flat end 66 which is attached to an exterior surface 67 of a preform 68 prior to inserting the preform 68 and attached part 63 into a blow mold cavity 69. The cavity 69 is provided with a recess 70 for receiving a protruding part end 71. When the preform 68 and attached part 63 are inserted into the mold cavity 62, the protruding part end 71 extends into the recess 70, as shown in FIG. 23. As the bottle is subsequently blown into contact with the mold cavity 69, the protruding part end 71 is forced further into the recess 70 until the part head 66 abuts the walls of the mold cavity 69, as shown in FIG. 24. After the bottle 65 has been cooled by contact with the colder surfaces of the mold cavity 69, it is separated from the mold cavity 69, as shown in FIG. 25. The resulting bottle 65 has a flat exterior surface or wall 64 which extends flush with the part head 66 and the end 71 of the part 63 projects from the bottle wall 64. The protruding part end 71 is then available for attachment of other parts or devices to the container 65. In the case of the part 63 being a threaded stud, a nut may be attached to the projecting end 71. Or, the projecting end 71 may be in the form of a hook or handle for the container 65.

FIGS. 26-28 show the use of the present invention for embossing lettering or a decoration in a container 74 blown from a thermoplastic material in accordance with the method of the present invention. Prior to inserting a preform 75 into a blow mold cavity 76, an embossing plate 77 is attached to an exterior surface of the preform 75. The plate 77 has a textured surface 79 which contacts the preform surface 78. The textured surface 79 contains either a raised or a recessed embossment defining a decoration or letterng to be applied to the finished article 74. The preform 75 and attached plate 77 are inserted into the blow mold cavity 76, as shown in FIG. 26, and the preform 75 is expanded by blowing into contact with the mold cavity 76. The blowing pressure is sufficient to embed the plate 77 into a wall 80 of the blown container 74. During the blowing, a surface portion 81 of the wall 80 which abuts the plate 77 flows into contact with the textured surface 79 of the plate 77. After blowing, the container 74 is removed from the mold cavity 76 and, then, the plate 77 is separated from the container 74, as shown in FIG. 28. The surface area 81 of the container wall 80 is textured in a manner identical to the complement of the textured surface 79 on the removed plate 77. Through this technique, the container surface area 81 may be decorated or may be labeled with lettering and/or numbers. Since the plate 77 was originally attached to the preform 75 rather than positioned initially in the mold cavity 76 or formed directly as a portion of the mold cavity 76, lettering or numbering applied to successively molded containers is easily changed. For example, the plate 77 may contain an identification number for a product sold in the molded container 74 which is manufactured in a single batch. When the container 74 is to be used for storing material from a different batch, a different plate 77 may be used for molding a different identification number on the container 74.

As shown in FIGS. 29-31, the method of the present invention is adaptable for manufacturing a container 82 having a blind, threaded hole 83 formed directly in a wall 84. Before inserting a preform 85 for the container 82 into a blow mold cavity 86, a plug 87 having an external thread 88 is attached to a surface 89 of the preform 85. The preform 85 and attached plug 87 are then positioned within the mold cavity 86, as shown in FIG. 29. When the preform 85 is subsequently blown into the shape of the container 82, the plug 87 is embedded into the container wall 84, as shown in FIG. 30. After the thermoplastic material forming the container 82 has hardened, the container 82 is removed from the mold cavity 86. The plug 87 is then unscrewed from the container 82, leaving the blind, threaded hole 83 in the container wall 84, as shown in FIG. 31. If desired, the blind bottom 90 of the threaded hole 83 may be removed to provide a threaded hole 83 opening through the wall 84 of the container 82.

FIGS. 32–34 illustrate the method of the present invention used for attaching a rubber pad 91 to a wall 92 of a blow molded container 93. The pad 91 is preferably of the self-sticking type, having an adhesive coated surface 94. Before inserting a preform 95 for the container 93 into a mold cavity 96, the pad 91 is attached to the preform 95 by contacting the adhesive surface 94 against a surface area 97 on the preform 95. It may be necessary to slightly press the pad 91 against the soft preform 95 for the adhesive surface 94 to stick adequately to the preform surface 97. This may cause a slight depression in the preform surface 97, shown in FIG. 32. After the pad 91 is attached to the preform 92 and positioned in the blow mold cavity 96, the preform 95 is blown into the shape of the container 93, as shown in FIG. 33. It will be noted that the blowing pressure is sufficient to compress the rubber pad 91 and the compressed pad 91 is completely embedded within the wall 92 of blown container 93. When the container 93 is subsequently separated from the mold cavity 96, as shown in FIG. 34, the pad 91 reexpands to project from the container wall 92. However, a portion of the rubber pad 91 remains with a recess 98 in the container wall 92 for firmly holding the pad 91 in place on the container wall 92. It should be noted that the adhesive used for initially attaching the rubber pad 91 to the preform 95 is of any suitable type, including a type which chemically reacts with the thermoplastic material from which the container 93 is made under the pressures and temperatures of blowing for achieving a strong bond between the pad 91 and the container 93.

It is sometimes necessary to attach a pipe or other similar fitting to a container blow molded from a thermoplastic material. FIGS. 35–38 illustrate the use of the present invention for providing a blow molded container 100 with a projecting, externally threaded part 101 surrounding an opening 102 into such container 100. The prefabricated part 101 generally includes a hollow tubular portion 103 having an externally threaded surface 104. A shoulder or flange 105 extends radially outwardly from the tubular portion 103 for embedding into a wall 106 of the container 100. During transfer of a preform 107 from a preform mold to a final blow mold cavity 108, the part shoulder 105 is attached to a surface area 109 on the preform 107 by any suitable means. The preform 107 and attached part 101 are then inserted into the blow mold cavity 108. The tubular portion 103 which projects from the preform surface 109 extends into a recess 110 formed in the mold cavity 108, as shown in FIG. 35. The recess 110 is connected through a passageway 111 and a valve 112 to the atmosphere. During the major portion of the cycle of blowing the finished container 100 from the preform 107, the valve 112 is closed. The container 100 is then blown into contact with the walls of the mold cavity 108, as shown in FIG. 36. The material forming the container wall 106 extends flush with and embeds the flange 105 on the part 101 and completely covers an opening 113 through the part 101. However, due to the compressability of the air within the passageway 111 and the opening 113, the thermoplastic material will partially enter the opening 113. After the container 100 is blown into contact with the mold cavity 108, as shown in FIG. 36, and before removing the blowing pressure, the valve 112 is opened to vent the recess 110 to the atmosphere, as shown in FIG. 37. Upon opening the valve 112, the compressed gas within the container 100 ruptures the portion of the wall 106 extending over the opening 113 to form the opening 102 through the part 101. When the container 100 is subsequently removed from the mold cavity 108, as shown in FIG. 38, the container wall 106 extends flush with the outer surface of the part shoulder or flange 105 and the tubular part end 103 projects from the container wall 106. The threaded surface 104 on the projecting end 103 is used for attaching a pipe or other fitting to the container 100. The part 101 also may be used for providing a liquid level indicator in the container 100. In this case, a transparent or see-through closure is threaded onto the part 101 to provide a window for viewing liquid level within the container 100.

The remaining FIGS. 39–43 show the use of the method of the present invention for embedding a prefabricated part into the wall of a blow molded container and subsequently drawing the embedded part into a die for cutting a clean hole into the wall of the container at the point at which the part was originally embedded. FIGS. 39–43 illustrate the use of a part 116 for cutting a round hole 117 into a wall 118 of a container 119 blow molded from a suitable thermoplastic material. The part 116 is similar to a flathead screw having a head portion 120 attached to a threaded stem 121. The head 120 has a flat surface 122 which is attached to a preform 123 before the preform 123 is inserted into a cavity 124 of a blow mold 125. A generally conical or tapered surface 126 extends between he surface 122 and the threaded stem 121. The head also includes one or more undercut grooves 127. The part 116 is attached to the preform 123 by any suitable method, as by applying an adhesive to the surface 122 and contacting the surface 122 with the preform 123. After attaching the part 116 to the preform 123, the preform 123 is positioned within the blow mold cavity 124, as shown in FIG. 39. A recess 128 is provided in the mold 125 for receiving the threaded stem 121 as the preform 123 is expanded into the finished container 119, as shown in FIG. 40. During expansion of the preform 123 within the mold cavity 124, the thermoplastic material is stretched to surround and embed the head 120 of the part 116. The thermoplastic material also flows into the undercut groove 127 in the head 120. After molding, the container 119 and embedded part 116 are removed from the mold cavity 124. A die 129 is positioned over the projecting threaded stem 121 and the stem 121 is engaged with a threaded tool 130. The die 129 includes an opening 131 which corresponds in shape to the shape of an outer edge 132 on the part head 120. By rotating the tool 130, the threaded stem 121 is advanced into the die 129, pulling the part head 120 from the container 119 and through the die opening 132. As the part head 120 advances into the die opening 131, a ring-shaped or annular cutout is also pulled through the die opening 131 and into the die 129. At the same time, the undercut 127 pulls a plug 134 formed from the thermoplastic material covering the surface 122 through the newly cut opening 117 in the container 119, as shown in FIG. 42. Since both the annular cutout 133 and the plug 134 are removed from the container 119, as shown in FIGS. 42 and 43, the resulting hole 117 is clean and there is no need for subsequently removing chips or scraps of the thermoplastic material from the interior of the container 119. It should be noted here that by changing the shape of the outer edge 132 of the head 120 and correspondingly changing the shape of the opening 131 in the die 129, different size and shaped openings may be cut into containers blow molded from thermoplastic material.

In the above-described embodiments of the invention, various exemplary prefabricated parts have been shown attached to containers blow molded from thermoplastic material. Exemplary containers would include bottles and vehicle fuel tanks. However, the invention is equally applicable to other hollow articles blow molded from thermoplastic materials. The prefabricated parts attached to the blow molded articles may be of the same thermoplastic material from which the article is made or from a different thermoplastic material, a metal, or other materials which are not destroyed at the temperatures encountered during the blow molding process. It should also be appreciated that various means may be used for adhering or temporarily attaching the prefabricated part to the preform before inserting the preform and attached part into the blow mold cavity. For example, the part may be attached to the preform with an adhesive, with mechanical bonding or with a welding between the part and the preform. The best method for attaching the part is determined at least in part by the materials from which the part and preform are manufactured. It will be appreciated that various other changes and modifications may be made in the method of the present invention without departing from the spirit and the scope of the following claims.

What I claim is:

1. A method for forming a hollow article from a thermoplastic material comprising the steps of: forming a parison from a heated mass of said material; blowing the parison in a cavity in a first mold defining a shape smaller than the article to form a preform; removing the preform from the first mold cavity; attaching at least one prefabricated part to an external surface area on the preform; positioning the preform and the attached part in a cavity in a second mold defining the external shape of the article; blowing the preform into contact with the second mold whereby the preform is shaped into the article with the part at least partially embedded in the article; removing the article from the second mold cavity; positioning a die against the article adjacent the prefabricated part; and drawing the prefabricated part from the article and into the die to cut an opening in the shape of the part into the article.

2. A method for forming a hollow article from a thermoplastic material comprising the steps of: forming a parison from a heated mass of said material; blowing the parison in a cavity in a first mold defining a shape smaller than the article to form a preform; removing the preform from the first mold cavity; attaching at least one prefabricated part to an external surface area of the preform; positioning the preform and the attached part in a cavity in a second mold defining the external shape of the article; blowing the preform into contact with the second mold whereby the preform is shaped into the article with the part at least partially embedded in the article; venting an opening in the prefabricated part to the atmosphere while simultaneously applying a sufficient blowing pressure to the article to rupture a surface of the article aligned with said part opening, said ruptured surface extending into said part opening; and removing the article from the second mold cavity.

* * * * *